US 6,705,690 B1

(12) United States Patent
O'Brien

(10) Patent No.: US 6,705,690 B1
(45) Date of Patent: Mar. 16, 2004

(54) TRASH RECEPTACLE DEVICE

(76) Inventor: Sherry D. O'Brien, 2631 University Blvd. N, #F211, Jacksonville, FL (US) 32211

( * ) Notice: Subject to any disclaimer, the term of this patent is extended or adjusted under 35 U.S.C. 154(b) by 0 days.

(21) Appl. No.: 09/991,173

(22) Filed: Nov. 16, 2001

(51) Int. Cl.⁷ .............................................. A47B 88/00
(52) U.S. Cl. ............................. 312/334.6; 312/334.33; 224/281
(58) Field of Search ..................... 312/334.6, 334.13, 312/334.18, 246, 334.31, 334.39; 224/281, 554

(56) References Cited

U.S. PATENT DOCUMENTS

| | | | |
|---|---|---|---|
| 2,226,434 A | * 12/1940 | Hirsh ........................... 224/281 |
| 2,275,060 A | * 3/1942 | Griffin .................... 312/334.27 |
| 2,301,730 A | 11/1942 | Mann |
| 2,883,234 A | 4/1959 | Biondo |
| 3,606,112 A | * 9/1971 | Cheshier ...................... 224/554 |
| 3,679,274 A | * 7/1972 | Nance .................... 312/334.36 |
| 3,694,048 A | * 9/1972 | Middleton .................. 312/246 |
| 3,848,841 A | 11/1974 | Rafeldt |
| D295,618 S | 5/1988 | Whitley, II |
| 5,038,982 A | 8/1991 | Salveson |
| 5,230,554 A | * 7/1993 | Camilleri ................ 312/334.31 |
| 5,460,309 A | * 10/1995 | Nehl et al. ................... 224/281 |
| 5,743,585 A | 4/1998 | Pranger et al. |
| 6,039,422 A | * 3/2000 | Butters et al. ........... 312/334.1 |
| 6,109,493 A | * 8/2000 | Bieri ........................... 224/483 |
| 6,394,567 B1 | * 5/2002 | Welch .................... 312/334.41 |

FOREIGN PATENT DOCUMENTS

FR    2 745 770 A1 * 9/1997 ............. B60R/7/06

* cited by examiner

*Primary Examiner*—Lanna Mai
*Assistant Examiner*—Jerry Anderson

(57) ABSTRACT

A trash receptacle device includes a pair of railings. Each of the railings has an open side such that the open sides are positioned such that they face each other. Each of the railing is mountable to a bottom wall of the glove compartment. A housing has a lower wall, a first side wall, a second side wall, a third side wall and a fourth side wall. The first and second side walls are positioned opposite of each other. Each of the first and second side walls has an elongated slot therein positioned generally adjacent to and extending along the lower wall. A pair of carriages, each of the carriages is slidably mounted on one of the rails. Each of the carriages is removably attached to the housing such that said housing is extendable along said rails.

7 Claims, 4 Drawing Sheets

TRASH RECEPTACLE DEVICE

BACKGROUND OF THE INVENTION

1. Field of the Invention

The present invention relates to trash receptacle devices and more particularly pertains to a new trash receptacle device for allowing the user to efficiently dispose of trash while in a vehicle.

2. Description of the Prior Art

The use of trash receptacle devices is known in the prior art. U.S. Pat. No. 2,883,234 describes a device for vehicle dash compartment. Another type of trash receptacle devices is U.S. Pat. No. 5,743,585 having a trash container apparatus.

While these devices fulfill their respective, particular objectives and requirements, the need remains for a device that has certain improved features that allow the present invention to be adapted to fit an existing vehicle or be incorporated into a new vehicles dashboard.

SUMMARY OF THE INVENTION

The present invention meets the needs presented above by being adaptable to fit and existing vehicle or being able to be integrated into the dashboard of a new vehicle.

Still yet another object of the present invention is to provide a new trash receptacle device that is conveniently located within the car interior and is removable for ease of disposal.

Even still another object of the present invention is to provide a new trash receptacle device that prevents trash from getting stuck under foot of the driver, which could create a possible driving hazard.

To this end, the present invention generally comprises a pair of railings. Each of the railings is elongated and has a first end and a second end. Each of the railings has an open side such that the open sides are positioned such that they face each other. Each of the railing is mountable to a bottom wall of the glove compartment. A housing has a lower wall, a first side wall, a second side wall, a third side wall and a fourth side wall. The first and second side walls are positioned opposite of each other. Each of the first and second side walls has an elongated slot therein positioned generally adjacent to and extending along the lower wall. A pair of carriages, each of the carriages is slidably mounted on one of the rails. Each of the carriages is removably attached to the housing such that said housing is extendable along said rails.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
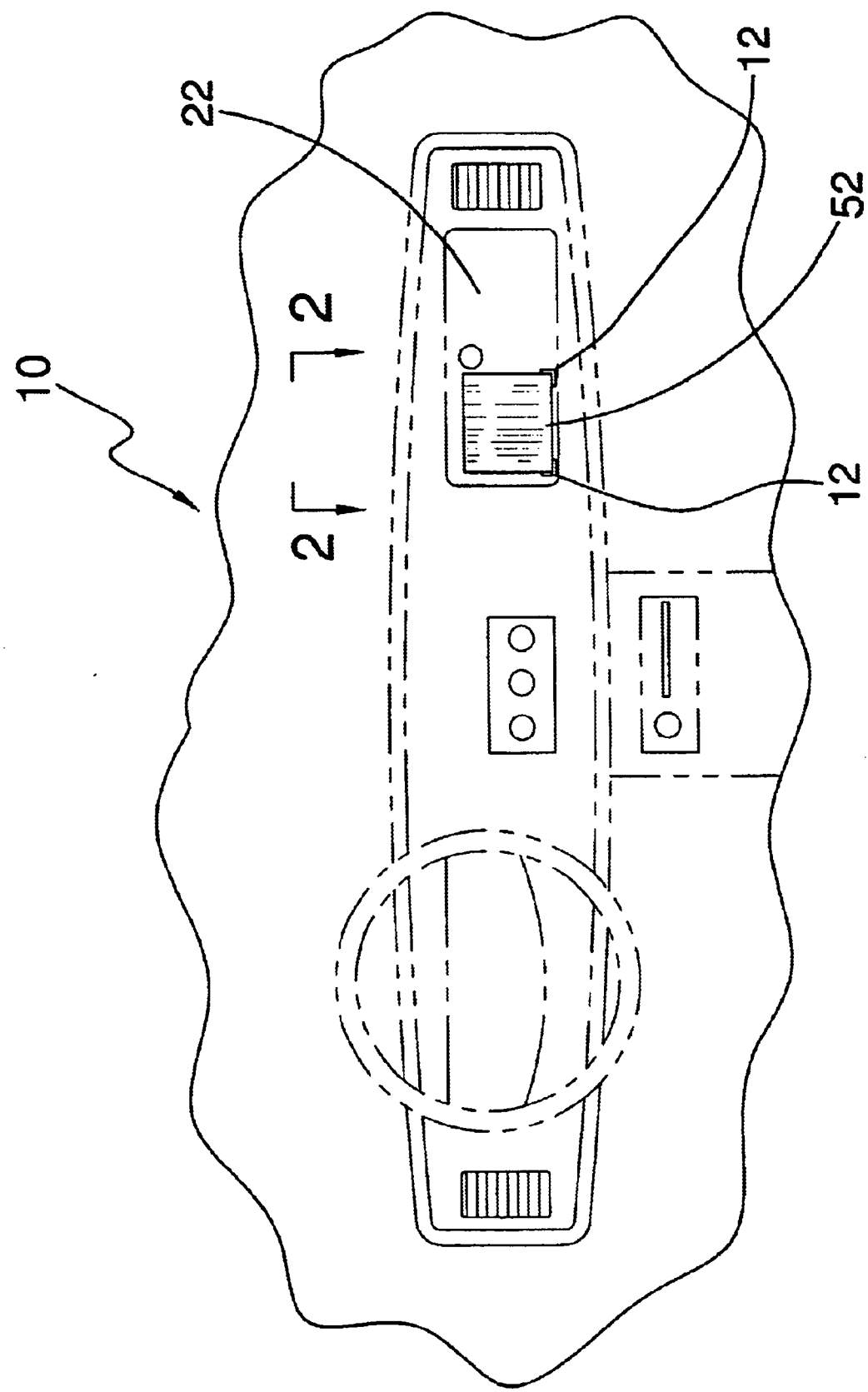
FIG. 1 is a front view of a new trash receptacle device according to the present invention.
Figure 2:
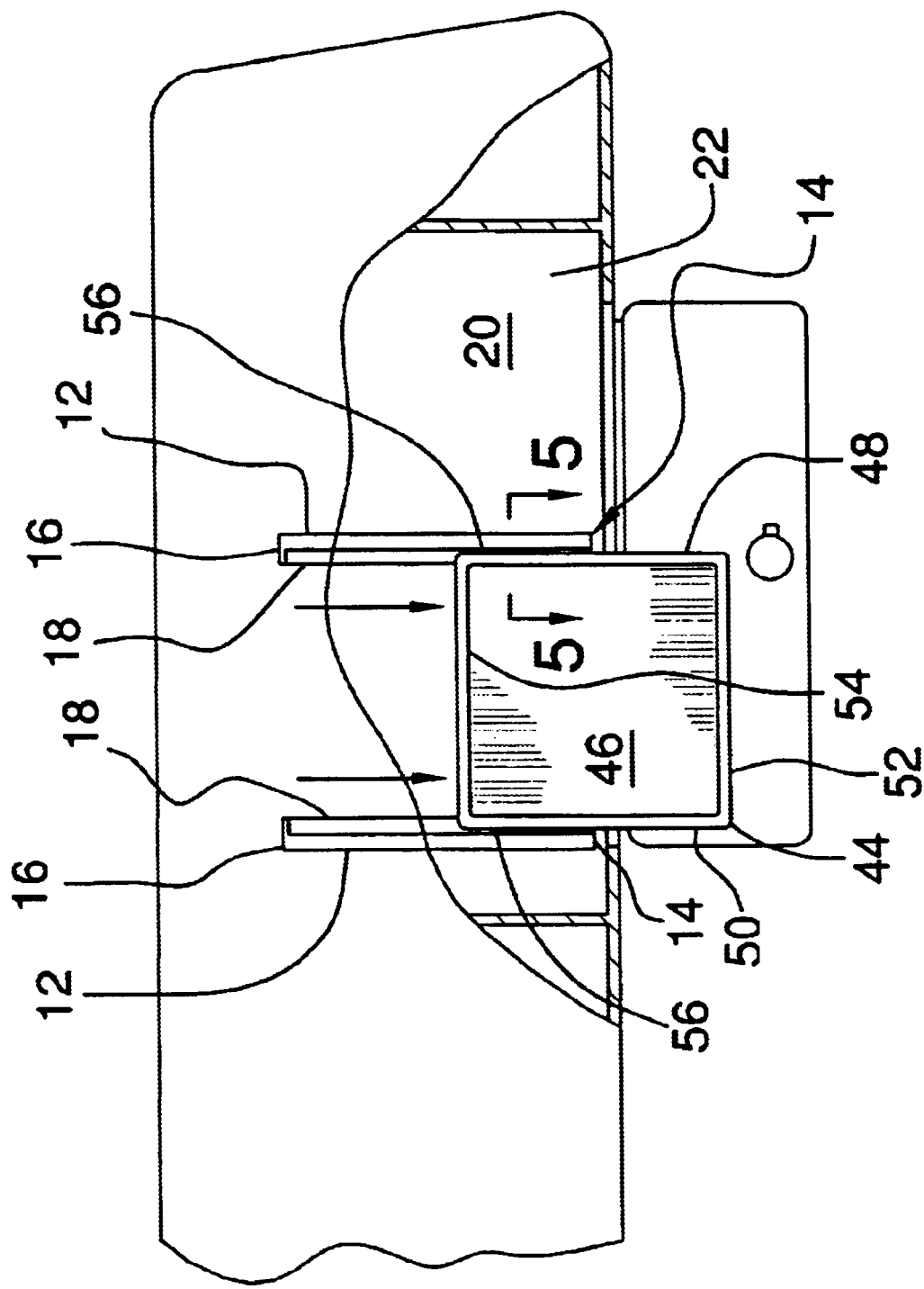
FIG. 2 is a top view of the present invention.
Figure 3:
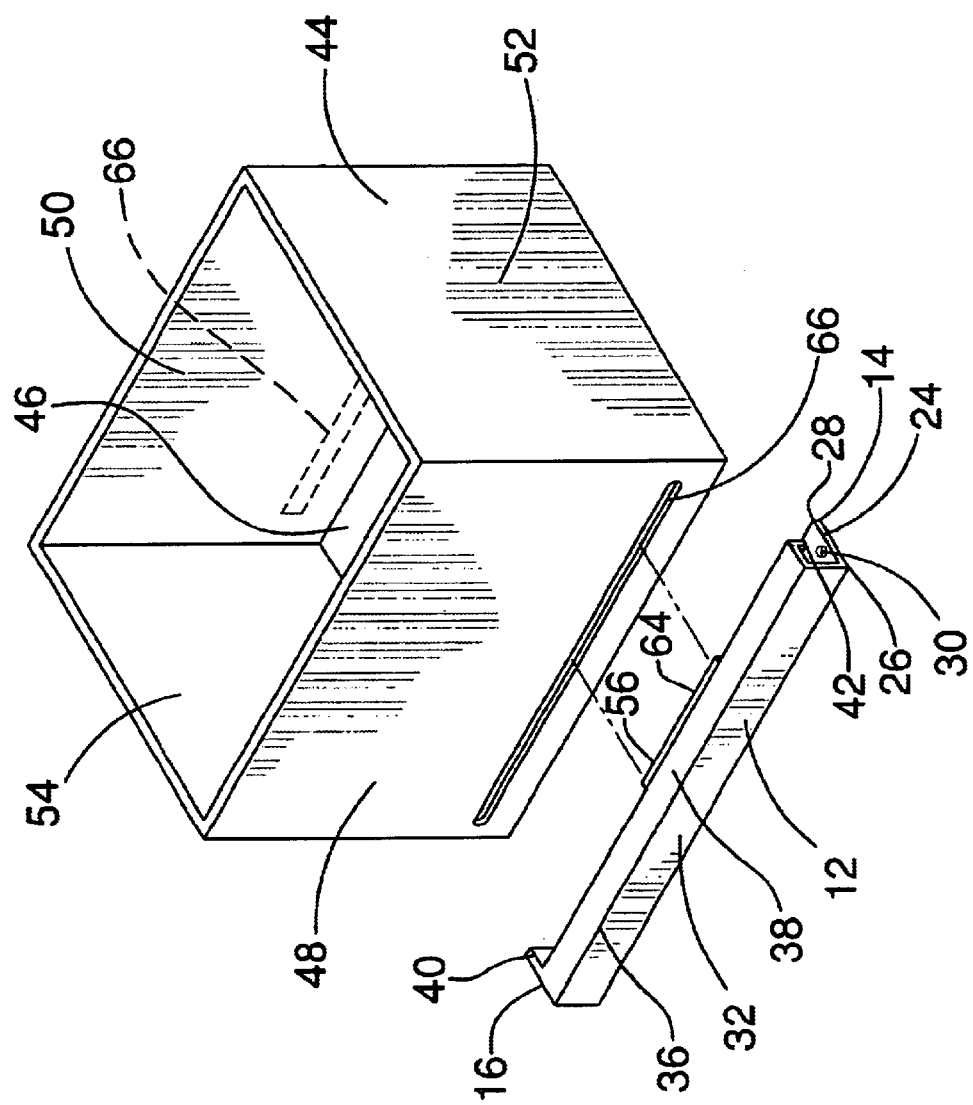
FIG. 3 is a perspective view of the present invention.
Figure 4:
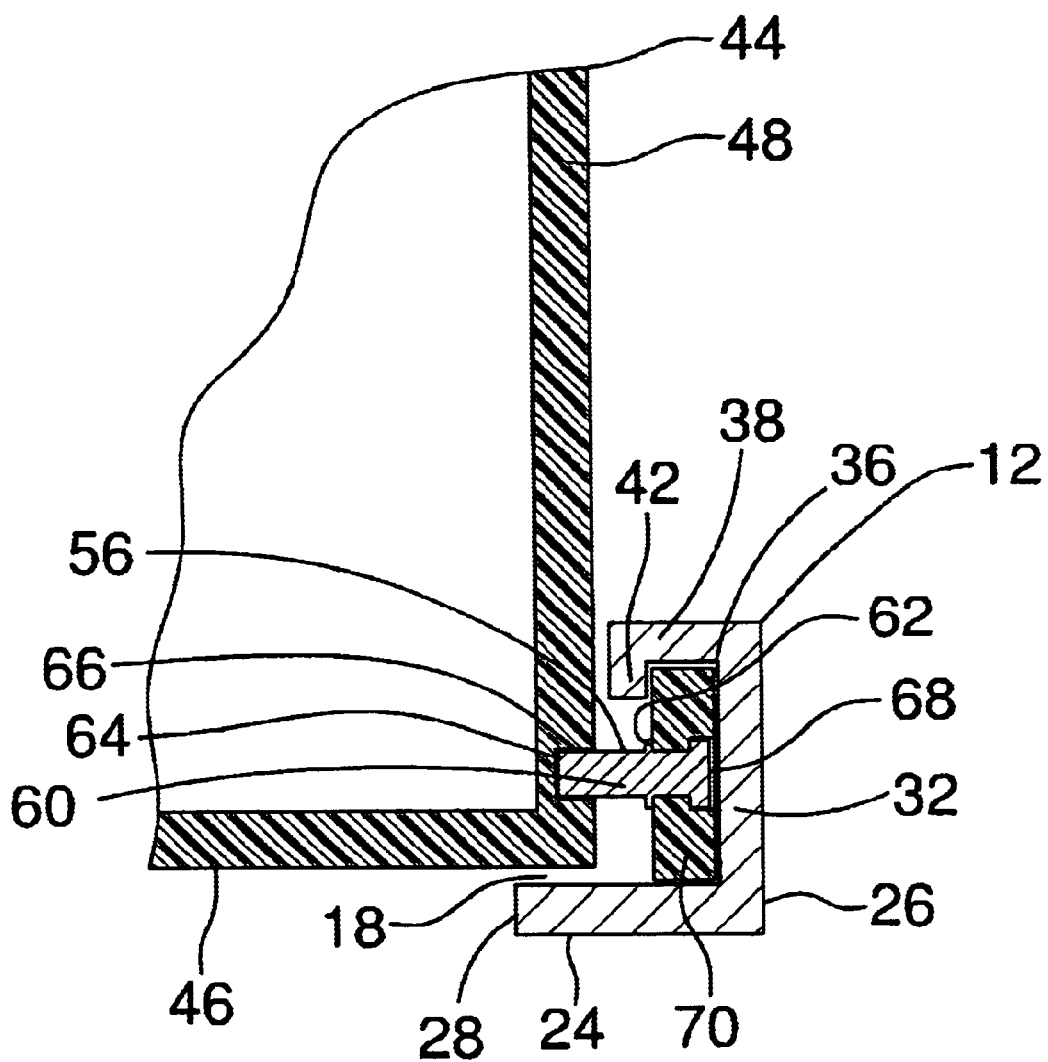
FIG. 4 is a cross-sectional view of the present invention.

With reference now to the drawings, and in particular to FIGS. 1 through 4 thereof, a new trash receptacle device embodying the principles and concepts of the present invention and generally designated by the reference numeral 10 will be described.

As best illustrated in FIGS. 1 through 4, the trash receptacle device 10 generally comprises a pair of railings 12. Each of the railings 12 is elongated and has a first end 14 and a second end 16. Each of the railings 12 has an open side 18 such that the open sides 18 are positioned such that the open side 18 of one of the railings 12 faces the open side 18 of the other one of the railings 12. Each of the railing 12 is mountable to a bottom wall 20 of the glove compartment 22, each of the railings 12 includes a base 24 that is elongated and has a first side edge 26 and a second side edge 28. A plurality of fasteners 30 are extendable into the base 24 for releasably fastening the base 24 to the bottom wall 20 of the glove compartment 22.

A vertical wall 32 is attached to and extends along a length of the first side edge 26 of the base 24. The vertical wall 32 has an upper edge 36. A horizontal wall 38 is attached to and extends along length of the upper edge 36. The horizontal wall 38 extends partially over the base 24. The open side 18 is defined between the horizontal wall 38 and the base 24.

A back wall 40 is positioned adjacent the second end 16 of the associated one of the railings 12 and extends upwardly from the base 24 of the associated one of the railings 12. The back wall 40 is attached to the vertical 32 and horizontal walls 38. A lip 42 is attached to and extends along a length of the horizontal wall 38; the lip 42 extends toward the base 24.

A housing 44 has a lower wall 46, a first side wall 48, a second side wall 50, a third side wall 52 and a fourth side wall 54. The first side wall 48 is positioned opposite the second side wall 50. Each of the first and second side walls 48,50 has an elongated slot 66 therein positioned generally adjacent to and extending along the lower wall 46.

A pair of carriages 56, each of the carriages 56 is slidably positioned in the open side 18 of one of the railings 12. Each of the carriages 56 is removably attachable to the housing 44 such that the housing 44 is extendable along the railings 12. Each of the carriages 56 includes a plate 60 that has an inner edge 62 and an outer edge 64. The outer edge 64 is selectively inserted into one of the slots 66 of the housing 44. An axle 68 is attached to and extends away from the inner edge 62 of the plate 60. A wheel 70 is rotatably coupled to the axle 68. The wheel 70 has a diameter generally equal to a distance between the base 24 and the horizontal wall 38 such that the wheel 70 is positioned between the lip 42 and vertical wall 32.

In use, when the user wants to dispose of garbage within the interior, the flush-mount door on the dash would be pulled to slide out the container on rails. Once the trash is dropped into the top of the exposed container, the device could be slid back inside the dashboard so it remains neatly hidden.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trash receptacle device for removably positioning within a glove compartment of an automobile, said device comprising:
   a pair of railings, each of said railings being elongated and having a first end and a second end, each of said railings having an open side such that said open sides are positioned such that said open side of one of said railings faces said open side of the other of said railings, each of said railing being mountable to a bottom wall of the glove compartment;
   a housing having a lower wall, a first side wall, a second side wall, a third side wall and a fourth side wall, said first side wall being positioned opposite said second side wall, each of said first and second side walls having an elongated slot therein positioned generally adjacent to and extending along said lower wall; and
   a pair of carriages, each of said carriages being slidably mounted on one of said rails, each of said carriages being removably inserted into, one of said elongated slots of said housing such that said housing is selectively positionable along a length of said railings.

2. The trash receptacle device as in claim 1, wherein each of said carriages is positioned in said open side of one of said railings such that each of said carriages is slidable along a portion of a length of the associated one of said railings.

3. The trash receptacle device as in claim 2, wherein each of said railings includes:
   a base being elongated and having a first side edge and a second side edge, a plurality of fasteners being extendable into said base for releasably fastening said base to the bottom wall of the glove compartment;
   a vertical wall being attached to and extending along a length of said first edge of said base, said vertical wall having an upper edge;
   a horizontal wall being attached to and extending along length of said upper edge, said horizontal wall extending partially over said base, said open side being defined between said horizontal wall and said base.

4. The trash receptacle device as in claim 3, wherein each of said railings further includes a back wall being positioned adjacent said second end of the associated one of said railings and extending upwardly from said base of the associated one of said railings, said back wall being attached to said vertical and horizontal walls such that said back wall is for inhibiting the associated one of said carriages from exiting the associated one said railing from said second end of the associated one of said railings.

5. The trash receptacle device as in claim 3, wherein each of said railings further includes a lip being attached to and extending along a length of said horizontal wall, said lip extending toward said base.

6. The trash receptacle device as in claim 1, wherein each of said carriages comprises:
   a plate having an inner edge and an outer edge, said outer edge being selectively inserted into one of said slots; and
   an axle being attached to and extending away from said inner edge of said plate, a wheel being rotatably coupled to said axle.

7. A trash receptacle device for removably positioning within a glove compartment of an automobile, said device comprising:
   a pair of railings, each of said railings being elongated and having a first end and a second end, each of said railings having an open side such that said open sides are positioned such that said open side of one of said railings faces said open side of the other of said railings, each of said railings being mountable to a bottom wall of the glove compartment, each of said railings including;
   a base being elongated and having a first side edge and a second side edge, a plurality of fasteners being extendable into said base for releasably fastening said base to the bottom wall of the glove compartment;
   a vertical wall being attached to and extending along a length of said first edge of said base, said vertical wall having an upper edge;
   a horizontal wall being attached to and extending along length of said upper edge, said horizontal wall extending partially over said base, said open side being defined between said horizontal wall and said base;
   a back wall being positioned adjacent said second end of the associated one of said railings and extending upwardly from said base of the associated one of said railings, said back wall being attached to said vertical and horizontal walls such that said back wall is for inhibiting the associated one of said carriages from exiting the associated one said railing from said second end of the associated one of said railings;
   a lip being attached to and extending along a length of said horizontal wall, said lip extending toward said base;
   a housing having a lower wall, a first side wall, a second side wall, a third side wall and a fourth side wall, said first side wall being positioned opposite said second side wall, each of said first and second side walls having an elongated slot therein positioned generally adjacent to and extending along said lower wall;
   a pair of carriages, each of said carriages being slidably positioned in one of said open sides of said rails, each of said carriages being removably inserted into said housing such that said housing is selectively positionable along a length of said railings, each of said carriages comprising;
   a plate having an inner edge and an outer edge, said outer edge being selectively inserted into one of said slots; and
   an axle being attached to and extending away from said inner edge of said plate, a wheel being rotatably coupled to said axle, said wheel having a diameter generally equal to a distance between said base and said horizontal wall such that said wheel is positioned between said lip and vertical wall.

* * * * *